US011358092B2

(12) United States Patent
Suzuki et al.

(10) Patent No.: US 11,358,092 B2
(45) Date of Patent: Jun. 14, 2022

(54) ACIDIC GAS ABSORBENT, ACIDIC GAS REMOVAL METHOD AND ACIDIC GAS REMOVAL APPARATUS

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Akiko Suzuki, Ota (JP); Yoshihiko Nakano, Yokohama (JP); Reiko Yoshimura, Kawasaki (JP); Toshihiro Imada, Kawasaki (JP); Takashi Kuboki, Ota (JP); Kenji Sano, Inagi (JP); Mitsuru Udatsu, Kawasaki (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 106 days.

(21) Appl. No.: 17/014,796

(22) Filed: Sep. 8, 2020

(65) Prior Publication Data
US 2021/0291108 A1 Sep. 23, 2021

(30) Foreign Application Priority Data
Mar. 18, 2020 (JP) .............................. JP2020-048107

(51) Int. Cl.
*B01D 53/14* (2006.01)
*B01D 53/18* (2006.01)

(52) U.S. Cl.
CPC ..... *B01D 53/1493* (2013.01); *B01D 53/1425* (2013.01); *B01D 53/1475* (2013.01); (Continued)

(58) Field of Classification Search
CPC .... B01D 2252/204; B01D 2252/20431; B01D 2252/20447; B01D 2252/20489; (Continued)

(56) References Cited

U.S. PATENT DOCUMENTS

| 6,174,506 B1 | 1/2001 | Chakravarti et al. |
| 8,506,913 B2 | 8/2013 | Murai et al. |

(Continued)

FOREIGN PATENT DOCUMENTS

| JP | 3663117 B2 | 6/2005 |
| JP | 2007-137725 A | 6/2007 |

(Continued)

*Primary Examiner* — Jennifer K Michener
*Assistant Examiner* — Cabrena Holecek
(74) *Attorney, Agent, or Firm* — Oblon, McClelland, Maier & Neustadt, L.L.P.

(57) ABSTRACT

The embodiments provide an acidic gas absorbent kept from deterioration, an acidic gas removal method using the absorbent, and an acidic gas removal apparatus using the same. The acidic gas absorbent contains an amine compound and water, and further contains superfine bubble containing inert gas wherein an average diameter of said superfine bubble is 150 nm or less. The acidic gas removal method provided here employs that absorbent. The acidic gas removal apparatus is equipped with a unit for introducing the superfine bubbles into the absorbent.

8 Claims, 1 Drawing Sheet

(52) U.S. Cl.
  CPC .... B01D 53/18 (2013.01); *B01D 2252/20431* (2013.01); *B01D 2252/20447* (2013.01); *B01D 2252/20489* (2013.01); *B01D 2252/504* (2013.01); *B01D 2252/606* (2013.01); *B01D 2252/608* (2013.01)

(58) Field of Classification Search
  CPC ........ B01D 2252/504; B01D 2252/606; B01D 2252/608; B01D 53/1425; B01D 53/1468; B01D 53/1475; B01D 53/1493; B01D 53/18
  See application file for complete search history.

(56) References Cited

U.S. PATENT DOCUMENTS

| | | | |
|---|---|---|---|
| 8,545,783 | B2 | 10/2013 | Murai et al. |
| 8,845,797 | B2 | 9/2014 | Iijima et al. |
| 9,409,119 | B2 | 8/2016 | Murai et al. |
| 9,446,346 | B2 | 9/2016 | Murai et al. |
| 9,724,642 | B2 | 8/2017 | Murai et al. |
| 10,046,269 | B2 | 8/2018 | Murai et al. |
| 10,625,200 | B2 | 4/2020 | Suzuki et al. |
| 2013/0343974 | A1 | 12/2013 | Murai et al. |
| 2015/0044114 | A1 | 2/2015 | Murai et al. |
| 2017/0266607 | A1 | 9/2017 | Watando et al. |
| 2018/0272267 | A1 | 9/2018 | Kondo et al. |
| 2018/0345210 | A1* | 12/2018 | Miyake .............. B01D 17/0205 |
| 2019/0083921 | A1 | 3/2019 | Suzuki et al. |
| 2019/0160422 | A1 | 5/2019 | Murai et al. |
| 2020/0047110 | A1 | 2/2020 | Suzuki et al. |
| 2020/0086265 | A1 | 3/2020 | Nakano et al. |
| 2020/0086266 | A1 | 3/2020 | Suzuki et al. |

FOREIGN PATENT DOCUMENTS

| | | | |
|---|---|---|---|
| JP | 2010-155753 | A | 7/2010 |
| JP | 2010-253370 | A | 11/2010 |
| JP | 2012-143744 | A | 8/2012 |
| JP | 2012-143745 | A | 8/2012 |
| JP | 2012-245483 | A | 12/2012 |
| JP | 2014-97498 | A | 5/2014 |
| JP | 5659084 | B2 | 1/2015 |
| JP | 5659127 | B2 | 1/2015 |
| JP | 5659128 | B2 | 1/2015 |
| JP | 2015-29987 | A | 2/2015 |
| JP | 2015-71136 | A | 4/2015 |
| JP | 5713997 | B2 | 5/2015 |
| JP | 2015-107443 | A | 6/2015 |
| JP | 2015-112574 | A | 6/2015 |
| JP | 2015-199007 | A | 11/2015 |
| JP | 5812661 | B2 | 11/2015 |
| JP | 5868795 | B2 | 2/2016 |
| JP | 2016-93793 | A | 5/2016 |
| JP | 2016-198714 | A | 12/2016 |
| JP | 2017-35669 | A | 2/2017 |
| JP | 2017-121610 | A | 7/2017 |
| JP | 6173817 | B2 | 8/2017 |
| JP | 2017-164696 | A | 9/2017 |
| JP | 2017-164697 | A | 9/2017 |
| JP | 2017-196547 | A | 11/2017 |
| JP | 2018-122278 | A | 8/2018 |
| JP | 2018-158302 | A | 10/2018 |
| JP | 2018-183729 | A | 11/2018 |
| JP | 2019-55371 | A | 4/2019 |
| JP | 2019-55394 | A | 4/2019 |
| JP | 2019-98284 | A | 6/2019 |
| JP | 2019-98316 | A | 6/2019 |
| JP | 2020-22933 | A | 2/2020 |
| JP | 2020-44489 | A | 3/2020 |
| JP | 2020-44490 | A | 3/2020 |
| JP | 2020-44492 | A | 3/2020 |

* cited by examiner

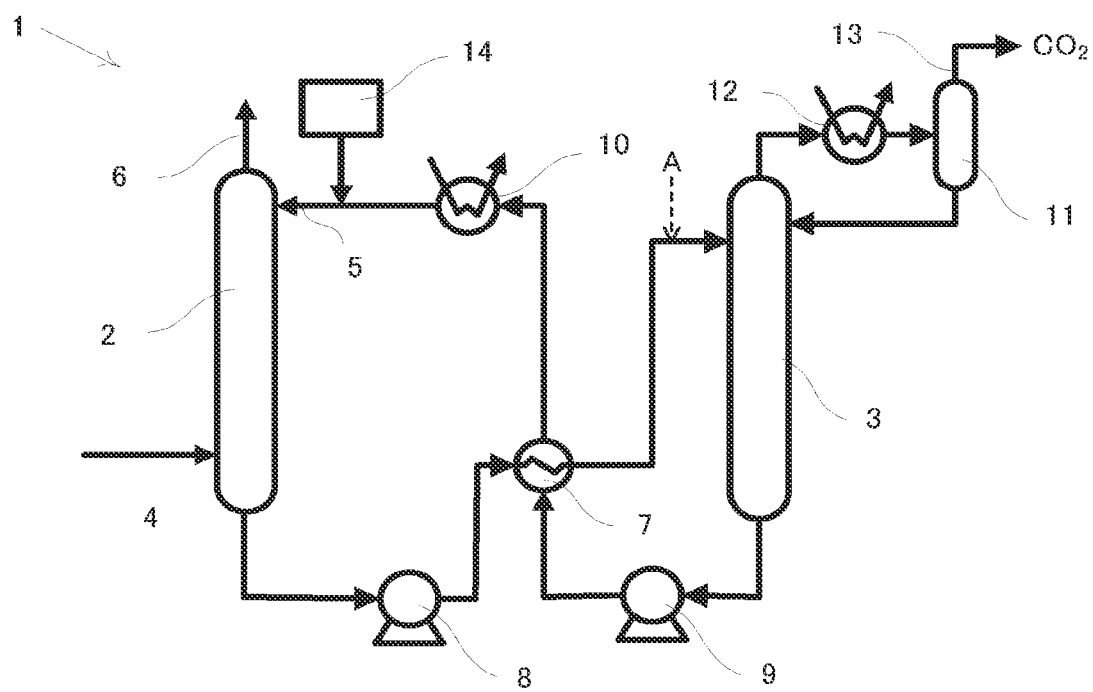

ACIDIC GAS ABSORBENT, ACIDIC GAS REMOVAL METHOD AND ACIDIC GAS REMOVAL APPARATUS

CROSS-REFERENCE TO RELATED APPLICATIONS

This application is based upon and claims the benefit of priority from the prior Japanese Patent Application No. 2020-048107, filed on Mar. 18, 2020, the entire contents of which are incorporated herein by reference.

FIELD

Embodiments of the present disclosure relate to an acidic gas absorbent, an acidic gas removal method and an acidic gas removal apparatus.

BACKGROUND

It has been recently pointed out that global warming is partly attributed to greenhouse effect caused by increase of carbon dioxide ($CO_2$) concentration, and it is urgent to take international measures to protect global environment. Carbon dioxide ($CO_2$) is largely generated by industrial activities, and there is an increasing momentum toward reduction of $CO_2$ emitted into the atmosphere. In particular, it is urgently necessary to reduce $CO_2$ emission from coal-fired power plants and factories. Further, it is also desired to reduce emission of acidic gases other than $CO_2$, such as hydrogen sulfide ($H_2S$).

In view of that, as means for reducing emission of acidic gases such as $CO_2$, much attention is paid to not only streamlining of thermal power plants or the like for emission reduction but also $CO_2$ recovery by use of chemical absorbents. As practical chemical absorbents, amine compounds have been studied for a long time. In carbon dioxide recovery systems, acidic gas absorbents containing the amine compounds are generally regenerated and cyclically used. In those cyclic uses, when absorbing or releasing $CO_2$, the acidic gas absorbents are often heated for regeneration. However, in this procedure, the amine compounds tend to be so denatured as to deteriorate the acidic gas absorbents by the action of oxygen or the like contained in the acidic gas.

BRIEF DESCRIPTION OF THE DRAWINGS

FIG. 1 schematically shows an acidic gas removal apparatus according to the embodiment.

DETAILED DESCRIPTION

The acidic gas absorbent according to an embodiment of the present disclosure contains an amine compound and water, and further contains superfine bubble containing inert gas wherein an average diameter of said superfine bubble is 150 nm or less.

Further, in the acidic gas removal method according to another embodiment of the disclosure, a gas containing an acidic gas is brought into contact with the above acidic gas absorbent so as to remove the acidic gas from the acidic gas-containing gas.

Furthermore, the acidic gas removal apparatus according to still another embodiment of the disclosure comprises:

an absorption unit in which a gas containing an acidic gas is brought into contact with an acidic gas absorbent containing an amine compound and water, so that the absorbent absorbs the acidic gas to remove it from the acidic gas-containing gas;

a superfine bubble-introducing unit in which superfine bubble containing inert gas wherein an average diameter of said superfine bubble is 150 nm or less are introduced into the above acidic gas absorbent; and a regeneration unit in which the absorbent holding the acidic gas is made to release the acidic gas so as to be regenerated;

so that the absorbent regenerated in the regeneration unit is reused in the absorption unit.

Embodiments will now be explained with reference to the accompanying drawings.

<Acidic Gas Absorbent>

In the following description, the embodiments will be explained mainly in case examples where the acidic gas is carbon dioxide ($CO_2$). However, the acidic gas absorbent according to the embodiment can give the same effect on other acidic gases such as hydrogen sulfide. Specifically, the absorbent of the embodiment is suitable to absorb oxidizing gases such as carbon dioxide and hydrogen sulfide. More specifically, the absorbent is particularly suitable for absorbing carbon dioxide and is advantageously employed in a system for recovering carbon dioxide from industrial exhaust fumes.

The acidic gas absorbent according to the embodiment contains an amine compound as a main agent for absorbing acidic gases. The amine compound can be selected from known ones generally adopted as acidic gas absorbents in consideration of the proper vapor pressure.

Examples of the usable amine compounds include primary amines, secondary amines, tertiary amines and quaternary ammoniums. In addition, polyamine compounds such as diamines and triamines are also employable. Further, it is still also possible to adopt derivatives in which hydrogens in the above amine compounds are replaced with substituents such as hydroxy or in which methylene groups in the amine compounds are replaced with oxy, carbonyl, sulfonyl or the like. Although amine compounds are water-soluble in general, it is preferred to use amines having high water-solubility.

Specifically, usable amine compounds are as follows:
(i) aminoalcohols,
(ii) cyclic amines,
(iii) primary amines,
(iv) secondary amines,
(v) tertiary amines,
(vi) polyamines,
(vii) polyalkylenepolyamines, and
(viii) amino acids.

Here, it should be noted that the above categories are only for the sake of convenience, and there are some amine compounds included in two or more of the above categories. For example, methyldiethanolamine is a kind of aminoalcohol and is also a kind of tertiary amine.

Among the above, it is preferred to adopt (i) aminoalcohols, (v) tertiary amines, (vii) polyalkylenepolyamines or (viii) amino acids because the diffusibility can be kept at a low level.

In the embodiment, it is preferred to adopt an amine compound having a low vapor pressure. If the amine compound has a low vapor pressure, it can be realized to keep the diffusibility thereof at a low level. Specifically, the amine compound has a vapor pressure of 0.001 to 10 Pa, preferably 0.005 to 5 Pa, more preferably 0.01 to 1 Pa at 20° C.

Preferred examples of the amine compound satisfying the above vapor pressure condition include: methyldiethanolamine (vapor pressure at 20° C.: 0.03 Pa), diethanolamine (vapor pressure at 20° C.: 0.04 Pa), and ethyldiethanolamine (vapor pressure at 20° C.: 0.3 Pa).

The acidic gas absorbent is repeatedly used, and hence the compound preferably has high stability. In view of that, it is preferred not to adopt ammonia or methylamine.

The acidic gas absorbent according to the embodiment also contains water as a solvent, and hence is an aqueous solution in which the above amine compound is dissolved or dispersed.

The acidic gas absorbent contains the amine compound in an amount of preferably 3 to 80 mass %, more preferably 10 to 75 mass %, further preferably 20 to 70 mass % based on the total mass of the absorbent.

It is generally preferred for the amine concentration to be high in view of energy consumption, plant scale and processing efficiency. That is because carbon dioxide is absorbed and released in large amounts per unit volume and further the rates thereof are high when the amine compound is contained in a high concentration.

However, if the amine concentration is too high, the absorbent may have increased viscosity and hence it is necessary to pay attention to that. Nevertheless, if the content of the amine compound is increased, it becomes possible for the absorbent to absorb carbon dioxide in a sufficient amount at a satisfying rate and accordingly to obtain excellent processing efficiency.

When adopted for recovering $CO_2$, the acidic gas absorbent containing the amine compound in an amount within the above range is not only capable of absorbing $CO_2$ in a large amount at a high rate but also capable of releasing $CO_2$ in a large amount at a high rate. Accordingly, the absorbent has the advantage of efficiently recovering carbon dioxide.

The acidic gas absorbent of the embodiment further contains superfine bubbles. The term "superfine bubbles (e.g., ultrafine bubbles)" in the embodiment means such minute bubbles having an average diameter of 150 nm or less as to be invisible with the eyes. Superfine bubbles have been under research and it is already known that solutions containing superfine bubbles are useful as detergents. Further, the present applicant has researched and found that superfine bubbles in combination with the acidic gas absorbent can prevent the amine compound from deterioration. In order to obtain that effect efficiently, inert gas is adopted for forming the superfine bubbles in the embodiment. The inert gas is preferably nitrogen, helium, neon or argon, more preferably nitrogen or argon. Among them, nitrogen is particularly preferred because having the advantage of cost.

In the embodiment, the superfine bubbles have an average diameter of 50 to 400 nm, preferably 150 nm or less. As for the number of the superfine bubbles, the acidic gas absorbent contains preferably $1\times10^7$ to $1\times10^{12}$ bubbles, more preferably $1\times10^9$ to $1\times10^{11}$ bubbles per 1 mL of the absorbent.

The average diameter and content (number) of the superfine bubbles can be measured by various methods, such as, particle trajectory analysis method, laser diffraction scattering method, dynamic light scattering method, resonance mass measurement method, or method of liquid dispersion stability evaluation. Among them, it is preferred to adopt the particle trajectory analysis method or the laser diffraction scattering method.

It is not clear the reason why the acidic gas absorbent containing the superfine bubbles tends not to deteriorate, but the reason is thought to be as follows. In the presence of the superfine bubbles, oxygen is kept from dissolving in the absorbent. Further, dissolved oxygen is easily released out of the absorbent by the action of the superfine bubbles. Consequently, the acidic gas absorbent contains such a small amount of oxygen that the amine compound is hardly denatured. The acidic gas absorbent is thus presumed to be kept from deterioration. In addition, the superfine bubbles are so stably present in the acidic gas absorbent that they are hardly released out of the solution, and accordingly the effect thereof characteristically continues for a long time.

In the embodiment, the superfine bubbles can be introduced into the acidic gas absorbent by use of any system. Examples of the system include ultrasonic system, swirl flow system, pressure dissolution system, and micropore system.

The acidic gas absorbent according to the embodiment contains the above amine compound, the above superfine bubbles and water, and can further contain other optional ingredients according to necessity.

Examples of the optional ingredients include: water-soluble polymer compounds, oxidation inhibitors, pH adjusters, defoaming agents, and anticorrosive agents.

The water-soluble polymer compounds have effects of properly controlling viscosity of the acidic gas absorbent and of improving diffusibility of the amine compound. The water-soluble polymer compound is preferably a water-soluble vinyl polymer or a water-soluble polysaccharide. Examples of the water-soluble vinyl polymer include: carboxy vinyl polymer, alkali metal salts of carboxy vinyl polymer, polyvinyl alcohol, polyvinylpyrrolidone, polyethylene glycol, and polyacrylic acid. Here, the "carboxy vinyl polymer" includes polyacrylic acid, polymethacrylic acid, polyacrylamide and copolymers thereof. The water-soluble polysaccharide may be a synthesized or natural substance and is preferably at least one selected from the group consisting of cellulose, carboxymethyl cellulose, methyl cellulose, pectin, gum arabic, alginic acid, and xanthan gum. Among them, cellulose is preferred because of easy availability. Cellulose may be in the form of cellulose nanofibers. The water-soluble polymer compound has a mass average molecular weight of 900 to 200000, preferably 1000 to 180000.

The acidic gas absorbent contains the water-soluble polymer compound in an amount of preferably 0.001 to 1 mass % based on the total mass of the absorbent. The more the absorbent contains the polymer compound, the more the diffusibility is improved. However, if the polymer compound is contained too much, the absorbent may have such a high viscosity as to be difficult to handle.

Preferred examples of the oxidation inhibitors include: dibutylhydroxytoluene (BHT), butylhydroxyanisole (BHA), sodium erythorbate, sodium nitrite, sulfur dioxide, 2-mercapto-imidazole and 2-mercaptobenzimidazole. When the oxidation inhibitor is incorporated, the amount thereof is preferably 0.01 to 1 mass %, more preferably 0.1 to 0.5 mass % (provided that the whole amount of the absorbent is regarded as 100 mass %). The oxidation inhibitor can inhibit deterioration of the absorbent to extend the working lifetime thereof.

Preferred examples of the defoaming agents include: silicone defoaming agents and organic defoaming agents. When the defoaming agent is incorporated, the amount thereof is preferably 0.00001 to 0.001 mass %, more preferably 0.0005 to 0.001 mass % (provided that the whole amount of the absorbent is regarded as 100 mass %). The defoaming agent can inhibit foaming of the absorbent so as to prevent decrease of absorption and release efficiencies and to keep the absorbent from degradation in fluidity and in circulation efficiency.

Preferred examples of the anticorrosive agents include: phosphate esters, tolyltriazoles, and benzotriazoles. When the anticorrosive agent is incorporated, the amount thereof is preferably 0.00003 to 0.0008 mass %, more preferably 0.00005 to 0.005 mass % (provided that the whole amount of the absorbent is regarded as 100 mass %). The anticorrosive agent prevents corrosion of the plant facilities to extend the working lifetime thereof.

There are no particular restrictions on the viscosity of the acidic gas absorbent, but it is preferably 0.1 to 200 mPa·s, more preferably 1 to 100 mPa·s at 25° C. The water-soluble polymer is incorporated so that the absorbent can exhibit sufficient performance, and hence the acidic gas absorbent has a high viscosity in general. However, if the viscosity is too high, the absorbent has poor handling properties.

The viscosity of the absorbent can be measured by means of VISCOMETER DV-II+Pro ([trademark], manufactured by BROOKFIELD).

<Acidic Gas Removal Method>

In the acidic gas removal method according to the embodiment, a gas containing an acidic gas is brought into contact with the acidic gas absorbent so as to remove the acidic gas from the acidic gas-containing gas.

The acidic gas removal method of the embodiment basically comprises: a step (absorption step) in which the aforementioned absorbent of the embodiment is made to absorb an acidic gas; and another step in which the acidic gas-holding absorbent of the embodiment is made to release the absorbed acidic gas.

Specifically, the acidic gas removal method according the embodiment essentially comprises: a step (acidic gas absorption step) in which an acidic gas-containing gas (e.g., exhaust gas or the like) is brought into contact with the acidic gas absorbent so that the acidic gas is absorbed in the absorbent; and another step (acidic gas separation step) in which the acidic gas-holding absorbent obtained in the above acidic gas absorption step is heated to release and remove the acidic gas from the absorbent. In addition, since the above-described acidic gas absorbent of the embodiment contains superfine bubbles, the method can further contain a step in which the superfine bubbles are introduced into the absorbent.

There are no particular restrictions on how an acidic gas-containing gas is brought into contact with an aqueous solution containing the above acidic gas absorbent. For example, the acidic gas-containing gas may be bubbled and thereby absorbed in the absorbent; the absorbent may be sprayed in the form of mist into a stream of the acidic gas-containing gas (spray method); or otherwise the acidic gas-containing gas may be brought into countercurrent contact with the absorbent in an absorption unit filled with a ceramic or metal mesh filler.

When the aqueous absorbent solution is made to absorb the acidic gas-containing gas, the temperature of the absorbent is preferably room temperature to 60° C. or less, more preferably 50° C. or less, further preferably 20 to 45° C. The lower the treating temperature is, the more the acidic gas is absorbed. However, the lower limit of the treating temperature can be determined according to the gas temperature in the process and also to the heat recovery target or the like. The pressure in the step of absorbing the acidic gas is normally near atmospheric pressure. Although the pressure can be increased to enhance the absorption performance, the process is preferably carried out at atmospheric pressure so as to save energy consumption used for compression.

In order to separate the acidic gas from the acidic gas-holding absorbent and to recover pure or highly concentrated carbon dioxide, the absorbent may be heated while the liquid interface thereof is spread in a plate column, in a spray tower or in a regeneration tower filled with a ceramic or metal mesh filler.

When the acidic gas is released, the acidic gas absorbent is kept at a temperature of normally 70° C. or more, preferably 80° C. or more, further preferably 90 to 120° C. The higher the temperature is, the more the acidic gas is released. However, in order to raise the temperature, it is necessary to increase energy for heating the absorbent. Accordingly, the temperature can be determined according to the gas temperature in the process and also to the heat recovery target or the like. The pressure in the step of releasing the acidic gas can be normally set at about 1 to 3 atm.

After the acidic gas is released, the acidic gas absorbent can be recycled and reused in the acidic gas absorption step. In addition, heat generated in the step of absorbing the acidic gas is generally cooled in a heat exchanger and used for preheating the aqueous solution supplied to the regeneration unit where the solution is processed for recycling.

The thus recovered acidic gas normally has a purity as high as 95 to 99 vol %. This pure or highly concentrated acidic gas can be utilized as a material for synthesizing chemicals and/or polymers or as a coolant for food freezing. Further, the recovered gas also can be subjected to segregated storage in the ground or the like by use of technologies under development.

The acidic gas absorbent according to the embodiment contains superfine bubbles. As described above, the superfine bubbles characteristically tend not to be released out of the acidic gas absorbent. Accordingly, if used from the beginning, the acidic gas absorbent containing superfine bubbles makes it possible to absorb and recover the acidic gas for a long time. However, in the long-term cyclic use, the superfine bubbles may decrease in the acidic gas absorbent. In view of that, the method preferably contains a step in which the superfine bubbles are introduced into the absorbent. This means that, if necessary, the superfine bubbles are continuously or intermittently introduced into the absorbent, so as to ensure highly-efficient and long-term absorption and recovery of the acidic gas. In the method containing the above step, the acidic gas absorbent without superfine bubbles can be initially prepared provided that the superfine bubbles are thereafter introduced therein before used for absorbing the acidic gas.

In that case, since being capable of inhibiting oxidation and thermal deterioration of the acidic gas absorbent, the superfine bubbles are preferably introduced therein immediately before the procedure in which the acidic gas absorbent is heated and thereby liable to deteriorate. Specifically, they are preferably introduced immediately before the absorbent absorbs the acidic gas in the absorption step or immediately before the absorbent is heated for regeneration.

<Acidic Gas Removal Apparatus>

The acidic gas removal apparatus according to the embodiment comprises:

an absorption unit in which a gas containing an acidic gas is brought into contact with the aforementioned acidic gas absorbent, so that the absorbent absorbs the acidic gas to remove it from the acidic gas-containing gas;

a superfine bubble-introducing unit in which superfine bubble containing inert gas wherein an average diameter of said superfine bubble is 150 nm or less are introduced into the above acidic gas absorbent; and a regeneration unit in which the absorbent holding the acidic gas is made to release the acidic gas so as to be regenerated;

so that the absorbent regenerated in the regeneration unit is reused in the absorption unit.

FIG. 1 schematically shows the acidic gas removal apparatus according to the embodiment.

The acidic gas removal apparatus 1 comprises: an absorption unit 2 in which a gas containing an acidic gas (e.g., exhaust gas) is brought into contact with the acidic gas absorbent, so that the absorbent absorbs the acidic gas to remove it from the acidic gas-containing gas; and a regeneration unit 3 in which the absorbent holding the acidic gas is made to release the acidic gas so as to be regenerated. In the following description, the explanation is given in case examples where the acidic gas is carbon dioxide.

As shown in FIG. 1, a discharge gas containing $CO_2$, such as, a combustion exhaust gas emitted from a thermal power plant or the like, is introduced through a gas inlet 4 into the lower part of the absorption unit 2. The discharge gas is confined in the absorption unit 2 and brought into contact with an acidic gas absorbent supplied from an absorbent inlet 5 provided on the upper part of the unit. As the acidic gas absorbent, the aforementioned absorbent of the embodiment is employed.

In the way described above, as the result of contact with the acidic gas absorbent, carbon dioxide is absorbed in the absorbent and thereby removed from the discharge gas. After treated to remove carbon dioxide, the discharge gas is emitted through a gas outlet 6 from the absorption unit 2.

The $CO_2$-holding absorbent is then sent by a rich liquid pump 8 to a heat exchanger 7 and then to the regeneration unit 3. In the regeneration unit 3, while the absorbent is moved down from the upper part to the lower part, the acidic gas is released from the absorbent and thereby the absorbent is regenerated.

The absorbent regenerated in the regeneration unit 3 is sent by a lean liquid pump 9 to the heat exchanger 7 and an absorbent cooler 10, and then returned into the absorption unit 2 through the absorbent inlet 5.

On the other hand, at the upper part of the regeneration unit 3, the acidic gas released from the absorbent is brought into contact with reflux water supplied from a reflux drum 11. The water is then transferred out of the regeneration unit 3.

The $CO_2$-containing reflux water is cooled with a reflux condenser 12, and thereafter separated in the reflux drum 11 into water and a liquid component condensed from water vapor accompanying $CO_2$. The liquid component is sent through an acidic gas recovering line 13 for the step of recovering the acidic gas. Meanwhile, the reflux water separated from the acidic gas is sent into the regeneration unit 3.

The acidic gas removal apparatus 1 further comprises a superfine bubble-introducing unit in which superfine bubble containing inert gas wherein an average diameter of said superfine bubble is 150 nm or less are introduced. This unit is for the purpose of introducing the superfine bubbles into the acidic gas absorbent. As an example, in the unit, superfine bubbles are initially introduced into water or the like and thereafter the obtained liquid is mixed with the acidic gas absorbent. As another example, in the unit, a portion of the circulating absorbent is taken out and superfine bubbles are introduced therein, and then returned to the bulk of the acidic gas absorbent. The superfine bubbles may be introduced at once, intermittently or continuously. In FIG. 1, the superfine bubble-introducing unit 14 is provided upstream of the absorption unit 2. In the apparatus having that constitution, the absorption unit is supplied with the acidic gas absorbent in which dissolved oxygen is reduced and therefore it becomes possible to keep the absorbent from thermal deterioration in the absorption unit. However, the installation point of the introducing unit is not limited to the above. For example, the introducing unit can be installed at the position A in FIG. 1, that is, upstream of the regeneration unit 3, so as to keep the absorbent from thermal deterioration in the regeneration unit. Further, the apparatus may comprise two or more superfine bubble-introducing units.

The acidic gas removal apparatus 1 thus employs the acidic gas absorbent excellent in acidic gas absorption and release performance, and thereby makes it possible to absorb and remove acidic gases efficiently.

Comparative Example 1

Methyldiethanolamine was dissolved in water to prepare an absorbent of Comparative example 1, which contained methyldiethanolamine in an amount of 45 mass %. The absorbent was bubbled with nitrogen for 1 hour, and then stored under atmosphere for a week. Subsequently, the absorbent was sealed in an autoclave under atmosphere, and then heated at 120° C. for 24 hours. Before and after the heating, the amine concentration was measured by gas chromatography-mass spectrometry (GC/MS) to calculate the rate of amine loss by heating.

Example 1

While being cooled with ice, methyldiethanolamine was dissolved in water containing $1.41 \times 10^{10}$ superfine nitrogen bubbles having an average diameter of 73.4 nm, to prepare an absorbent of Example 1, which contained methyldiethanolamine in an amount of 45 mass %. After the absorbent was stored under atmosphere for a week, the superfine bubbles in the absorbent were measured with a nanoparticle size analyzer SALD-7500nano X10 ([trademark], manufactured by Shimadzu Corporation). In the measurement, diffracted/scattered light intensity was measured with respect to each of the absorbent containing the superfine bubbles and a solvent without them (blank), so as to estimate the average diameter from the difference between the results. Specifically, first the blank sample was set in a batch cell and measured. Subsequently, after the blank sample was evacuated, the absorbent was poured into the batch cell with careful attention to avoid bubbling and then stirred a few times with a stir bar. After ripples and shimmers were confirmed to subside, the absorbent was measured. The measurement was carried out three times, and the results were averaged to determine the measured value. As a result, the average diameter of the superfine bubbles was found to be 107 nm, and the number of the superfine bubbles contained in 1 mL of the absorbent was found to be $8.1 \times 10^8$. Meanwhile, the absorbent was sealed in an autoclave under atmosphere, and then heated at 120° C. for 24 hours. From the amine concentrations before and after the heating, the rate of amine loss was calculated and found to decrease by 50% of that in Comparison example 1.

Comparative Example 2

Piperazine was dissolved in water to prepare an absorbent of Comparative example 2, which contained piperazine in an amount of 10 mass %. The rate of amine loss was calculated in the same manner as in Comparative example 1.

Example 2

Pipearzine was dissolved in water containing $1.41 \times 10^{10}$ superfine nitrogen bubbles having an average diameter of 73.4 nm, to prepare an absorbent of Example 2, which contained pipearzine in an amount of 10 mass %. After the absorbent was stored under atmosphere for a week, the superfine bubbles in the absorbent were measured in the same manner as in Example 1. As a result, the average diameter of the superfine bubbles was found to be 120 nm, and the number thereof contained in 1 mL of the absorbent was found to be $10.1 \times 10^{8}$. Further, the rate of amine loss was calculated in the same manner as in Example 1 and found to decrease by 70% of that in Comparison example 2.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fail within the scope and sprit of the invention.

The invention claimed is:

1. An acidic gas absorbent containing an amine compound, water and superfine bubble containing inert gas wherein an average diameter of said superfine bubble is 150 nm or less.

2. The acidic gas absorbent according to claim 1, wherein said inert gas is selected from the group consisting of nitrogen, helium, neon and argon.

3. The acidic gas absorbent according to claim 1, wherein said superfine bubbles are contained in an amount of $1 \times 10^{7}$ to $1 \times 10^{12}$ bubbles per 1 mL.

4. The acidic gas absorbent according to claim 1, wherein said amine compound is selected from the group consisting of primary amines, secondary amines, tertiary amines and quaternary ammoniums.

5. The acidic gas absorbent according to claim 1, wherein said amine compound is contained in an amount of 3 to 80 mass % based on the total mass of the acidic gas absorbent.

6. The acidic gas absorbent according to claim 1, which further contains at least one additive agent selected from the group consisting of oxidation inhibitors, pH adjusters, defoaming agents, and anticorrosive agents.

7. An acidic gas removal method in which
a gas containing an acidic gas is brought into contact with the acidic gas absorbent according to claim 1 so as to remove the acidic gas from the acidic gas-containing gas.

8. An acidic gas removal apparatus comprising:
an absorption unit in which a gas containing an acidic gas is brought into contact with an acidic gas absorbent containing an amine compound and water, so that the absorbent absorbs the acidic gas to remove it from the acidic gas-containing gas;
a superfine bubble-introducing unit in which superfine bubble containing inert gas wherein an average diameter of said superfine bubble is 150 nm or less are introduced into said acidic gas absorbent; and
a regeneration unit in which the absorbent holding the acidic gas is made to release the acidic gas so as to be regenerated;
so that the absorbent regenerated in the regeneration unit is reused in the absorption unit.

* * * * *